Jan. 12, 1960
KATSU KENNETH HORI ET AL
2,920,600
INTERMITTENT EXPLODING DEVICE
Filed Oct. 11, 1956
3 Sheets-Sheet 1
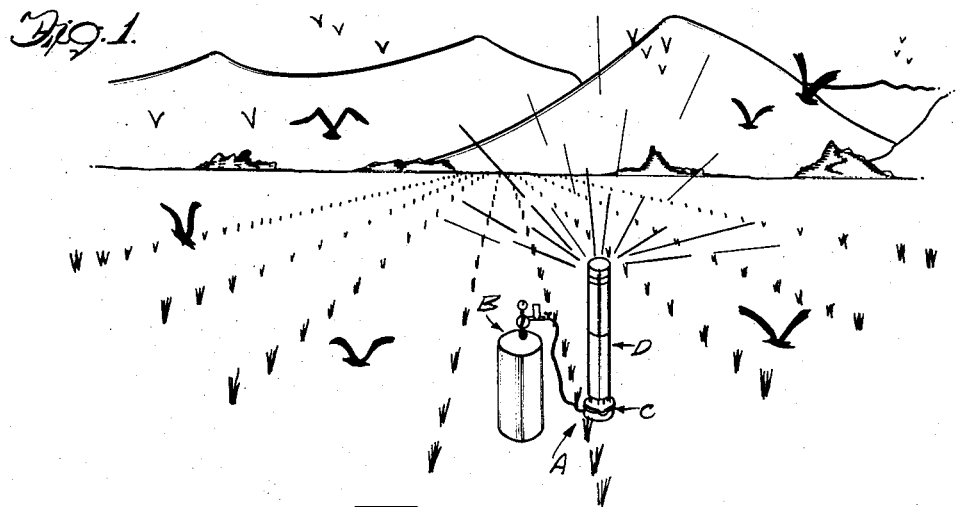
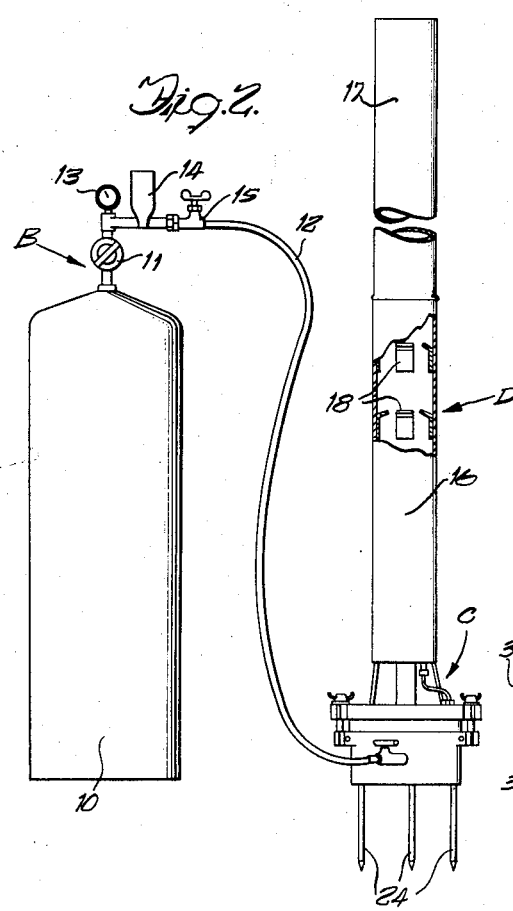
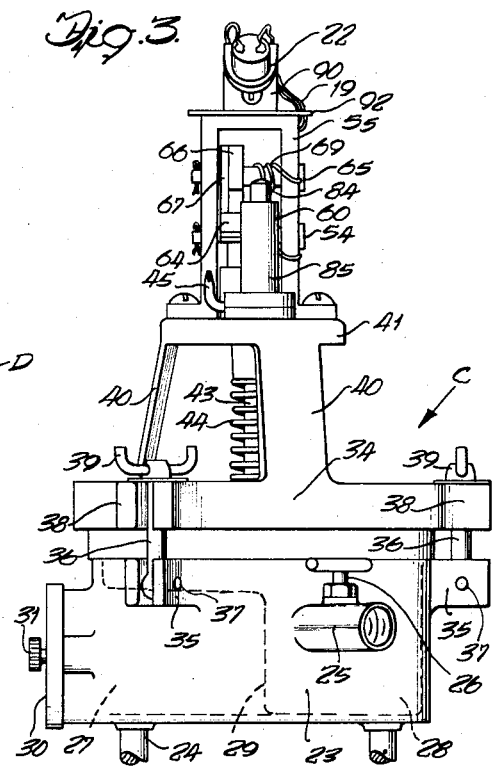
Inventors
Makoto Hori
Tow Hori
Katsu Kenneth Hori
Attorney

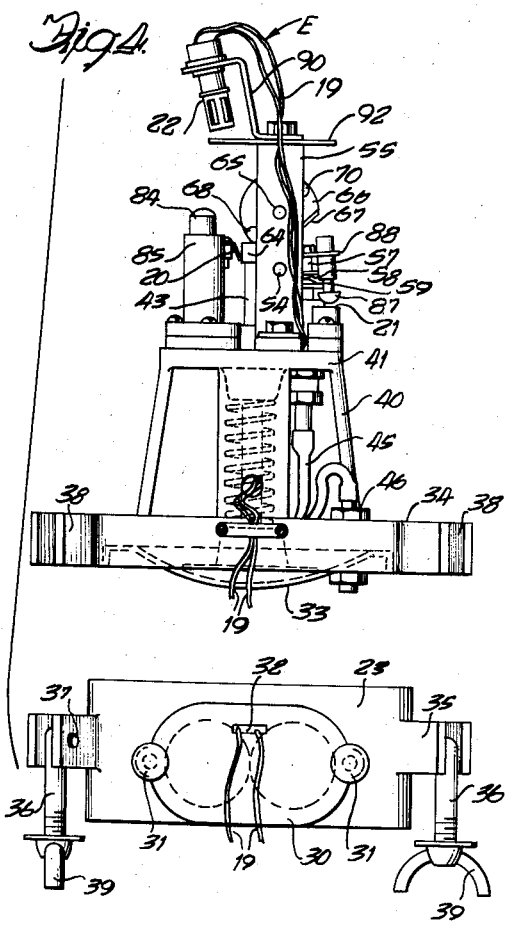
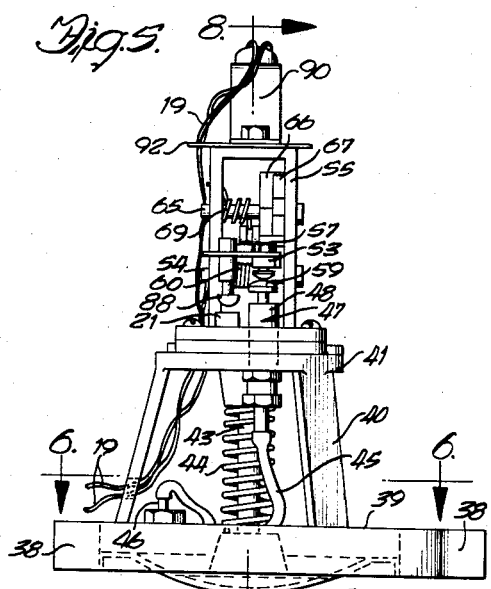
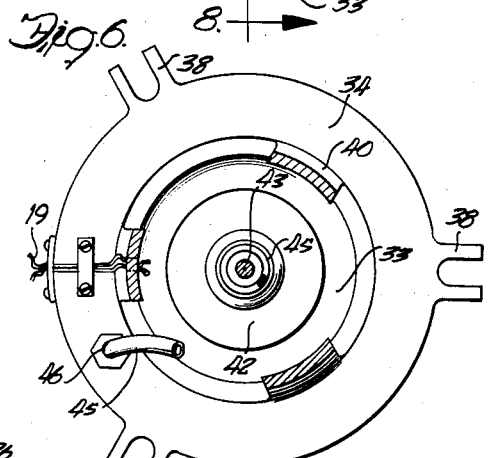
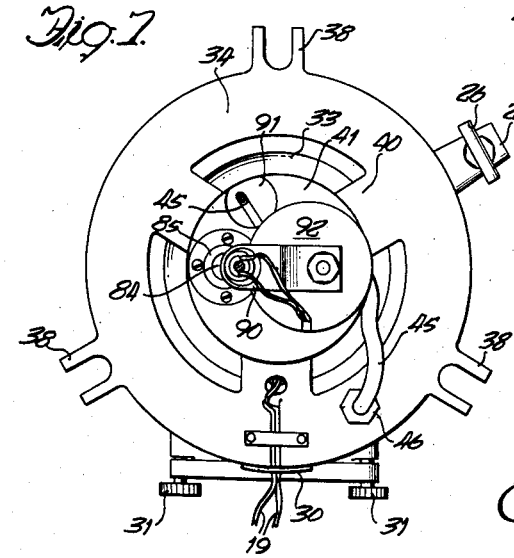

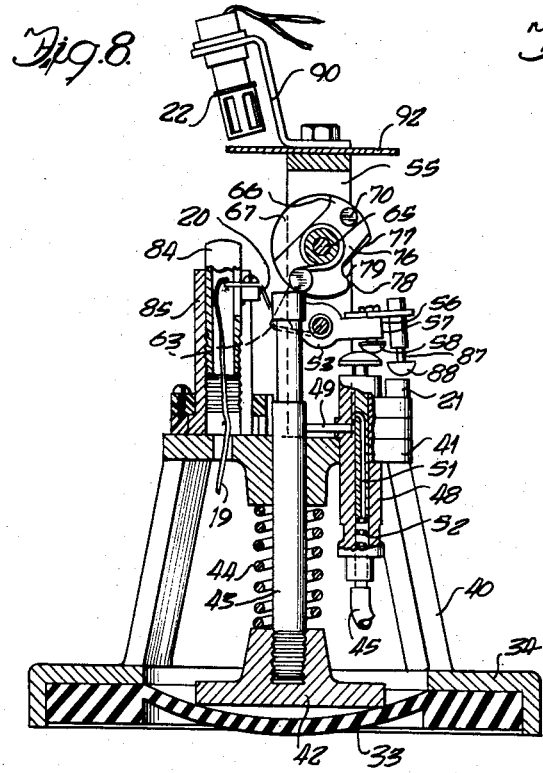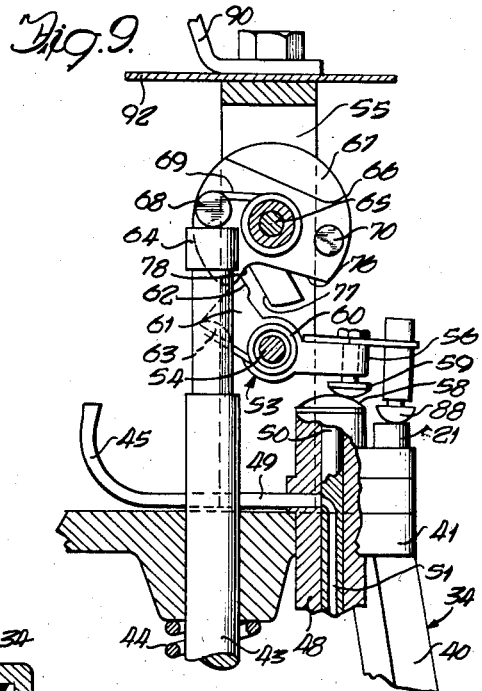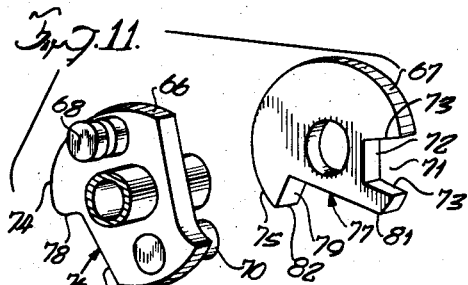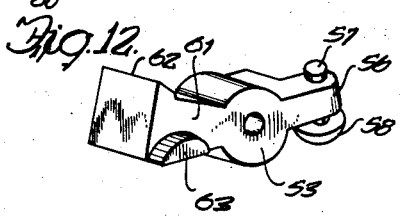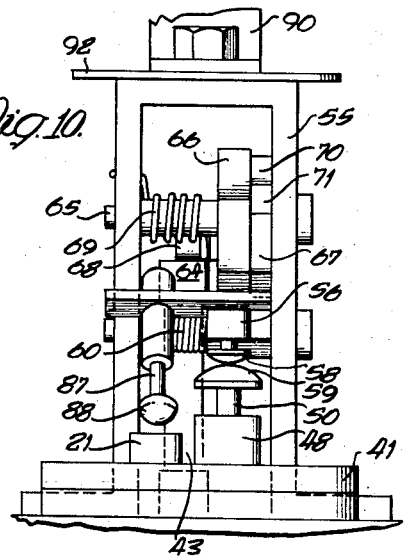

United States Patent Office 2,920,600
Patented Jan. 12, 1960

2,920,600

INTERMITTENT EXPLODING DEVICE

Katsu Kenneth Hori, Chicago, Ill., and Tow Hori and Makoto Hori, Los Angeles, Calif.

Application October 11, 1956, Serial No. 615,262

5 Claims. (Cl. 116—22)

This invention relates to a new and improved exploding device and more particularly to a new and improved automatic intermittent exploding device.

This is a continuation-in-part of the co-pending application of Makoto Hori, Tow Hori, and Katsu Kenneth Hori for an "Intermittent Exploder," Serial No. 534,009, filed September 13, 1955, now abandoned.

An effective and practical device for keeping birds and animals away from crops has long been sought by the farmers, especially when the marauders are wild life that are legally protected and therefore farmers must resort to scaring them away instead of destroying them.

The most common device employed by farmers is the scarecrow. However, the scarecrow tends to be ineffective especially after prolonged use when the birds and animals become accustomed to its presence. There have been many other devices developed and used for this purpose but none of them have been universally successful. They usually are too complicated and require constant attention so that they cannot be left to operate by themselves for long periods. Also most of them become ineffective after extended use as the wild life become accustomed to their presence. Further, some devices are rendered inoperative by adverse weather conditions and tend to be expensive and also dangerous.

What has been needed is a device that will operate continuously for long periods without attention and at little expense; that is simple and inexpensive in construction and operation; that remains effective to scare off birds and animals throughout extended use and that will continue to operate despite adverse weather conditions.

The present invention provides a device satisfying all of the above requirements. We have invented an automatic intermittent exploding device that periodically sets off a loud explosion with an associated flash capable of scaring away the boldest birds and animals without harming them. Since the blasts occur intermittently after periods of quiet, the birds and animals do not become accustomed to the presence of the sound and flash and therefore the device remains effective indefinitely. The device operates automatically from sources of gas and electricity and can continue in operation requiring no attention, the duration of operation depending only on the capacity of the sources of gas and electricity. Further the device is so designed that it is not affected by adverse weather conditions and requires no special attention during storms. Also the device is simple to construct and set in operation and is inexpensive to produce and market. In addition although the device is effective over a large area, it is relatively harmless to both wild life and humans.

The present invention is basically a gas exploding apparatus wherein combustible gas from a source is accumulated in a reservoir tank from which it is periodically discharged into a combustion chamber where it is ignited by an electrical igniting element. The periodical discharge of gas results in a pulsating pressure that is utilized to flex a diaphragm which automatically controls the repetitive operation of the device.

Therefore it is the general object of this invention to provide a new and improved intermittent exploding device.

A more specific object of this invention is to provide an intermittent exploding device that is capable of continued automatic operation.

Another object of this invention is to provide an intermittent exploding device that is capable of continued operation for a long period of time.

A further object of this invention is to provide an intermittent exploding device that is operable during all types of weather.

Still another object of this invention is to provide an intermittent exploding device that is automatically controlled by the pulsation of gas pressure within the apparatus.

Yet another object of this invention is to provide an intermittent exploding device of the type described in the preceding paragraphs wherein pulsating gas pressure in the apparatus is utilized to flex a diaphragm which operates both a valve operating mechanism and an electrical ignition circuit thereby automatically controlling the intermitten explosion.

Yet a further object of this invention is to provide an intermittent exploding device characterized by efficient gas consumption and a minimum escape of gas to the atmosphere.

A still further object of this invention is to provide an intermittent exploding device wherein the gas is positively ignited by an instantaneous electrical glow plug with a resulting minimum time of electrical circuit energization.

And yet another object of this invention is to provide an intermittent exploding device of the character described, of simple construction and which is inexpensive to manufacture and operate.

The invention is illustrated in a preferred embodiment in the accompanying drawings in which:

Figure 1 is a perspective view of one embodiment of the intermittent exploding device of this invention shown in use in a cultivated field;

Fig. 2 is an elevation view partially in section of the device of Fig. 1;

Fig. 3 is a front elevation view of the operating portion of the device of Fig. 1;

Fig. 4 is a side elevation view of the operating portion of the device of Fig. 1;

Fig. 5 is a rear elevation view of the operating portion of the device of Fig. 1;

Fig. 6 is a horizontal section taken along line 6—6 of Fig. 5;

Fig. 7 is a top plan view of the device of Fig. 5;

Fig. 8 is a vertical section taken along line 8—8 of Fig. 5;

Fig. 9 is an enlarged view of a portion of Fig. 8 showing the elements rotated to a different position;

Fig. 10 is an enlarged view of a portion of Fig. 5;

Fig. 11 is an exploded view of the cams of the device of Fig. 1; and

Fig. 12 is a perspective view of the bell crank of the device of Fig. 1.

While this device is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings and first to Figs. 1 and 2, an intermittent exploding device A is shown assembled for operation with a source of combustible gas B, operating means C and a combustion chamber or chimney D.

The source of combustible gas B consists of a standard commercial cannister 10 containing any desirable combustible gas, such as acetylene under pressure of about 250 p.s.i. The discharge of gas from the cannister is controlled by valve 11 which is adjustable to provide a desired pressure in the feed line 12 as shown in the gauge 13. A pressure of between 15 and 20 p.s.i. has been found to be desirable for proper operation of the device. A pressure regulator 14 is mounted across the gas feed line 12 and maintains a constant pressure in the line, such as 15–20 p.s.i. A needle valve 15 controls the flow of gas through the line 12 to the operating means C and is adjustable to vary the rate of flow into the operating means, thereby controlling the period of the cycle of operation.

The operating means C receives gas from the source B and periodically discharges a quantity of gas to the combustion chamber D. The operating means also periodically energizes an electrical ignition circuit E (Fig. 4) which ignites the gas within the chamber D resulting in an explosion producing a loud report and a bright flash. The periodic discharge of gas creates a pulsating pressure which is utilized to control reciprocation of the operating means and thus results in a continually self operating device.

The combustion chamber D consists of two open-ended cylinders 16 and 17 provided with baffles 18 which confine the movement of gas prior to combustion to increase the efficiency of fuel consumption. The baffles 18 also serve to increase the loudness of the audible report.

The electrical ignition circuit E, as best seen in Figs. 4 and 8, consists of electrical leads 19 leading from batteries (not shown) through contacts 20 and 21 to an igniting element 22 in the combustion chamber D. The contacts 20 and 21 are normally open but periodically closed by the operating means thereby energizing the igniting element 22 and automatically exploding the gas in the combustion chamber.

Referring now to Figs. 3 through 12, the operating means C will be described in detail.

A reservoir tank 23 preferably of cast iron or the like provides a base upon which the other elements are mounted. For added rigidity, the tank is adapted to receive anchoring legs 24 which can extend down into the ground upon which the tank is placed. The tank 23 is a sealed reservoir which accumulates gas from the source A through the line 12 and nipple 25 which is provided with a shut off valve 26. A battery storage compartment 27 is included in the tank 23 but is separated from the gas accumulating interior 28 by the walls 29. Electrical batteries (not shown) are stored in this recess for use in energizing the electrical ignition circuit E and are protected from decay by a cover 30 secured over the recess by locking screws 31 or the like. The cover 30 is provided with electrical terminals 32 to which the electrical leads 19 are removably attached for communication with the batteries.

The reservoir tank 23 is generally cup shaped having a flexible diaphragm 33 sealingly mounted over the top. The diaphragm 33 is secured in place by attachment of a supporting structure 34 to the rim of the tank 23 as by plurality of yokes 35 on the tank 23 within which bolts 36 are pivotally mounted on pins 37 and corresponding yokes 38 on the supporting structure 34 receiving the bolts which secure the tank 23 to the supporting structure 34 with the diaphragm 33 by the tightening of wing nuts 39 at the ends of the bolts 36.

The supporting structure 34 includes upwardly extending legs 40 supporting a mounting plate 41. The legs 40 are tapered inwardly to form a camming surface for receiving the chimney D which can be rigidly wedged in place forcing it downwardly on the tapered legs. A guide disc 42 floats on top of the diaphragm 33 and receives the lower end of a rod 43 which extends upwardly through an aperture in the mounting plate 41. The rod 43 and disc 42 are urged into contact with the diaphragm 33 by a coil spring 44 which is interposed between the mounting plate 41 and disc 42. Thus as gas pressure within the reservoir tank 23 flexes the diaphragm 33 a vertical displacement of the rod 43 occurs which is utilized to operate the device as will hereinafter be described.

A gas conduit 45 communicates with the interior of the reservoir tank 23 as by a fitting at 46 and extends into the interior of the combustion chamber D to discharge gas thereinto periodically as governed by a valve member 47 mounted on the mounting plate 41 intermediate the ends of the conduit 45.

The valve member 47 consists of a hollow cylindrical valve casing 48 having an aperture 49 in its side. A valve rod 50 is slidably positioned in the valve casing 48 and has an L-shaped hollow interior 51 which when aligned with the aperture 49 provides an open conduit. A valve spring 52 mounted in the valve casing 48 normally urges the valve rod 50 into a valve closed position.

The action of the valve rod 50 is controlled by movement of a bell crank 53 which is rockably mounted on a shaft 54 extending between the sides of a U-shaped bracket 55 that is secured to and extends above the mounting plate 41 of the supporting structure. A valve controlling arm 56 of the bell crank 53 has a valve engaging knob 57 attached thereto with a flanged end 58 for engagement with the flanged end 59 of the valve rod 50 for operation thereof. The knob 57 is threadably adjustable within the bell crank arm 56 for varying the control of the valve member 47. The bell crank 53 is normally urged in the valve open position by a bell crank spring 60 interposed between the U bracket 55 and the bell crank. The bell crank 53 also has an operating arm 61 having a cam engaging finger 62 and a rod engaging flange 63 extending therefrom. The rod engaging flange 63 extends into the path of movement of the enlarged end 64 of the operating rod 43 described above so that during a portion of the movement of the rod the enlarged end 64 will contact the flange 63 and rock the bell crank 53 to the valve open position.

Referring to Figs. 8, 9, 11 and 12 a cam shaft 65 is mounted between the sides of the U-shaped bracket 55 above the bell crank shaft 54 upon which two cam wheels 66 and 67 are rotatably mounted for engagement with the cam engaging finger 62 of the bell crank 53. The first cam 66 is a drive cam having a rod engaging lug 68 extending into the path of movement of the end of the rod 43 and is normally urged into contact therewith by a cam spring 69 interposed between the U-shaped bracket 55 and the drive cam 66. Thus linear reciprocation of the rod imparts angular reciprocation to the cam.

The second cam 67 is a driven cam which is rotated by a cam driving lug 70 on the drive cam 66 that extends into engagement with a lug receiving notch 71 on the driven cam 67. This lug receiving notch 71 has a base 72 and two sides 73 spaced apart a distance greater than the diameter of the lug 70 so that upon reversal of direction of the drive cam 66 there will be a momentary dwell of the driven cam 67, the importance of which will hereinafter be described. The outer peripheries 74 and 75 of the cams 66 and 67 generally coincide and when engaging the bell crank finger 62 maintain the bell crank in a valve closed position. A bell crank camming notch 76 on the drive cam 66 partially coincides with a bell crank camming notch on the driven cam 67.

Each notch has a leading surface 78 and 79 extending from the base of the notches 80 and 81 to the periphery 74 and 75 of the cam. These leading surfaces 78 and 79 are relatively positioned so that upon reciprocation with the above described dwell of the driven cam the leading surface 78 of the drive cam 66 will at all times lead the leading surface 79 of the driven cam 67. As will be seen from Figs. 8 and 9 as the cams rotate in a valve opening direction the cam engaging finger 62 of the bell crank 53 is prevented from following the leading surface 78 of the drive cam by the outer periphery 75 of the driven cam and therefore the leading surface 79 of the driven cam controls rocking of the bell crank 53 to the valve open position. This leading surface 79 on the driven cam is inclined inwardly away from the path of movement of the bell crank finger so that the bell crank finger 62 will snap unobstructed into the notch 77 thereby rapidly triggering the valve member 47 from closed to open. When the direction of rotation is reversed, the leading surface 78 of the drive cam 66 will again be leading and will abut against the finger 62 stopping further movement of the cams until the rod 43 rocks the bell crank 53 to the valve closed position thereby withdrawing the finger 62 from the notches 76 and 77. In order to permit relatively frictionless withdrawal of the finger 62, the leading surface 78 of the drive cam 66 is shaped to extend convexly outwardly away from the path of movement of the bell crank finger 62. If the leading surface 79 of the driven cam 67 were in contact with the bell crank finger 62 during withdrawal of the finger, there would be a tendency for the relatively sharp corner 82 where the periphery 75 and leading surface 79 meet to obstruct withdrawal of the finger 62.

The electrical circuit E as briefly described heretofore includes two contact members, the first of which is a rod engaging contact 83 mounted on a post 84 threadably adjustable within a hollow mounting 85 that extends upwardly from the mounting plate 41. The contact 83 extends into the path of movement of the enlarged end 64 of the operating rod 43 so that during a predetermined portion of the reciprocation of the rod depending on the post adjustment the contact will be closed. The other contact is a bell crank engaging contact 86 mounted on the plate 41 and is contacted by a spring urged plunger 87 secured to a flange 88 extending from the valve controlling arm 56 of the bell crank so that when the bell crank is in the valve open position the contact will be closed and the spring urged plunger 87 provides closure of the contact slightly before and after the valve member 47 is fully opened. One of the electrical leads 19 extends from the terminal 32 on the reservoir tank 23 to the rod engaging contact 86. The other lead extends from the terminal 32 to a glow plug 89 mounted on an extension 90 of the U-shaped bracket 55. A lead 19 also extends from the bell crank contact 86 to the glow plug 89 so that when both contacts are closed electrical current will flow from one contact across the rod 43 and bell crank 53 to the other contact thereby closing the circuit E and energizing the glow plug 89.

The glow plug 89, which is of any commercial type that is instantaneously heated to a gas igniting temperature causes the gas to explode in the presence of air which has entered through the top of the chimney D and the hole 91 provided in the mounting plate 41 of the supporting structure. To increase the efficiency of combustion a thin metal disc 92 is mounted on the bracket 55 immediately below the glow plug 89 thereby obstructing escape of the combustible materials before ignition.

The operation of the device is as follows: The control valve 11 is opened permitting gas to be discharged from the commercial cannister 10 at a rate which is adjusted by the needle valve 15 to produce explosions at any desired frequency, preferably between 3 and 30 minutes. The gas enters the reservoir tank 23 accumulating therein up to a pressure of 15 to 18 pounds per square inch. As this pressure is developing, the diaphragm 33 is flexed outwardly moving the rod 43 upwardly. As this occurs the cams 66 and 67 are rotated. During the first portion of rotation, the bell crank finger 62 rides on the outer periphery of the cams so that the valve member 47 remains closed. As the rod 43 continues upwardly it disengages the electrical contact 83 and the bell crank finger 62 snaps into the notch 77 of the driven cam 67 thereby rapidly triggering the valve member 47 open which simultaneously closes the bell crank contact 86. When the valve opens gas is discharged through the conduit 45 into the combustion chamber D thereby decreasing the pressure in the reservoir tank 23 flexing the diaphragm 33 inwardly and moving the rod 43 downwardly. As the rod moves downwardly the drive cam 66 follows the rod until the leading surface 78 engages the bell crank finger 62 at which time rotation of the cams 66 and 67 is stopped. The rod 43 continues downwardly engaging the flange 63 on the bell crank thus withdrawing the finger from the notch. During withdrawal the leading surface 78 of the drive cam continues in contact with the finger 62 of the bell crank until the finger is completely withdrawn at which time the cams 66 and 67 snap into the position where the lug 68 engages once again the rod 43.

When the rod first contacts the flange 63 on the bell crank, as described above, the bell crank is in the valve open position and therefore the bell crank contact 86 is closed. As the rod continues downwardly it closes the rod contact 83 thereby completing the electrical circuit E, energizing the glow plug 89 and exploding the gas within the chimney D. The circuit remains completed until the rod rocks the bell crank and associated plunger 87 out of engagement with the bell crank contact 86. As the bell crank is maintained in the valve closed position upon subsequent initial upward movement of the rod and since the rod disengages the contact 83 before the bell crank snaps open the circuit will not be completed at any time during the upward stroke.

As stated above, the frequency of normal operation of this device is between three and thirty minutes which produces a slow reciprocation of the rod. This would normally result in a slow opening of the valve and a resulting gas loss to the atmosphere. For this reason the previously described cam structure is important since the valve is opened very rapidly producing an immediate maximum flow producing a simultaneous pressure drop which acts through the operating means to ignite the gas and close the valve.

Similarly, the instantaneous glow plug and the positioning of the electrical contacts results in a short time circuit energization regardless of the frequency of the device. Thus conservation of gas and electricity are important advantages resulting from this invention.

Also fuel is conserved by more complete combustion because of the baffles 18 and metal disc 92 which are provided to prevent escape of gas before ignition and to increase the volume of the sound produced.

Because of the positive action of the elements and use of an electrical glow plug there is no difficulty in continuing operation during adverse weather conditions. Further, the compact assembly of the moving parts within and immediately below the chimney helps to protect the device. Also, its compactness and the upward direction of discharge makes it relatively harmless.

Thus we have invented an intermittent exploding device which can operate unattended for long periods of time by being automatically controlled by the pulsating gas pressure within the device. The device is very effective for continuous frightening of wild life and is inexpensive to produce and operate. Further it produces a sound and flash useful to scare wildlife over a large area.

We claim as our invention:

1. An intermittent exploding device, comprising: a sealed reservoir tank accumulating combustible gas from a source; a flexible diaphragm covering a portion of the surface of said tank, said diaphragm being flexed by the change in gas pressure within the tank; a supporting structure mounted on said tank; an open-ended combustion chamber mounted on said supporting structure; a gas conduit communicating between said tank and said chamber; a valve member mounted on the supporting structure operable to open and close said conduit to discharge gas periodically through the conduit into said chamber, resulting in a pulsating pressure within said tank capable of flexing said diaphragm; an ignition mechanism mounted on the supporting structure for igniting the gas in said chamber; and operating means mounted on said supporting structure movable with said flexible diaphragm to open said valve member upon a predetermined increase in gas pressure in the tank and to close said valve member upon a subsequent predetermined decrease in gas pressure, said operating means also actuating the ignition mechanism upon a desired decrease in pressure thereby exploding the gas within the chamber.

2. An intermittent exploding device comprising: a sealed reservoir tank accumulating combustible gas from a source; a flexible diaphragm covering a portion of the surface of said tank, said diaphragm being flexed by a change in gas pressure within the tank; a supporting structure mounted on said tank above said diaphragm; an open-ended combustion chamber mounted on said supporting structure; a conduit communicating between said tank and said chamber; a valve member mounted on said supporting structure operable to open and close said conduit so as to discharge gas periodically through the conduit into said chamber and produce a pulsating pressure within the tank; an ignition mechanism mounted on the supporting structure for igniting the gas in the combustion chamber; a rod reciprocally mounted on said supporting structure above said diaphragm and engageable therewith; a rod spring mounted on the supporting structure and urging the rod into engagement with the diaphragm so that pulsating flexure of the diaphragm is transmitted into reciprocal movement of the rod; camming means movably mounted on said supporting structure engageable with said rod and having a bell crank camming surface; a bell crank rotatably mounted on said supporting structure having a camming means engaging arm and a valve operating arm, said camming means engaging arm having a rod engaging flange; an increase in gas pressure in the tank flexing the diaphragm outwardly, raising said rod into engagement with the camming means and moving said camming means to rock the bell crank thereby opening the valve, a decrease in pressure flexing the diaphragm inwardly, lowering said rod which engages the rod engaging flange of the bell crank and rocks the bell crank to close said valve, lowering the rod also actuates the ignition mechanism thereby exploding the gas within the chamber.

3. An intermittent exploding device, comprising: a sealed reservoir tank accumulating combustible gas from a source; a flexible diaphragm covering a portion of the surface of said tank, said diaphragm being flexed by a change in gas pressure within the tank; a supporting structure mounted on said tank above said diaphragm; an open-ended combustion chamber mounted on said supporting structure; a conduit communicating between said tank and said chamber; a valve member mounted on said supporting structure operable to open and close said conduit so as to discharge gas periodically through the conduit into said chamber and produce a pulsating pressure within the tank; a rod reciprocally mounted on said supporting structure above said diaphragm and engageable therewith; a rod spring mounted on the supporting structure and urging the rod into engagement with the diaphragm so that pulsating flexure of the diaphragm is transmitted into reciprocal movement of the rod; valve operating means mounted on said supporting structure and engageable with said rod for movement therewith to open and close said valve upon reciprocation of the rod; and a normally open electrical ignition circuit mounted on said supporting structure having an igniting element within the combustion chamber, a rod engaging contact and an operating means engaging contact, said contacts concurrently engaging said rod and operating means when the rod and operating means are at predetermined positions thereby closing the circuit and energizing the igniting element so as to ignite the gas in the combustion chamber.

4. The intermittent exploding device of claim 3 wherein the position of one of said contacts of said electrical ignition circuit is adjustable so that the timing of the energizing of said igniting element can be varied.

5. The intermittent exploding device of claim 3 wherein the igniting element of the electrical ignition circuit is a glow coil that upon energization will instantaneously heat to a gas igniting temperature.

References Cited in the file of this patent

UNITED STATES PATENTS

| | | |
|---|---|---|
| 1,419,968 | Johnson | June 20, 1922 |
| 2,000,367 | Williamson | May 7, 1935 |
| 2,028,933 | Johnson | Jan. 28, 1936 |
| 2,304,358 | Hennefer | Dec. 8, 1942 |
| 2,693,232 | Hoff | Nov. 2, 1954 |
| 2,735,484 | Hoff | Feb. 21, 1956 |